United States Patent
Cox et al.

(10) Patent No.: US 11,397,613 B2
(45) Date of Patent: Jul. 26, 2022

(54) PROCESS PRIORITIZATION FOR INFORMATION HANDLING SYSTEMS

(71) Applicant: Dell Products L.P., Round Rock, TX (US)

(72) Inventors: Tyler Ryan Cox, Austin, TX (US); Marc Randall Hammons, Round Rock, TX (US); Nikhil Manohar Vichare, Austin, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 396 days.

(21) Appl. No.: 16/774,700

(22) Filed: Jan. 28, 2020

(65) Prior Publication Data

US 2021/0232425 A1     Jul. 29, 2021

(51) Int. Cl.
| | |
|---|---|
| *G06F 9/46* | (2006.01) |
| *G06F 9/48* | (2006.01) |
| *G06F 11/34* | (2006.01) |
| *G06F 11/30* | (2006.01) |

(52) U.S. Cl.
CPC ........ *G06F 9/4881* (2013.01); *G06F 11/3017* (2013.01); *G06F 11/3495* (2013.01)

(58) Field of Classification Search
CPC . G06F 9/4881; G06F 11/3017; G06F 11/3495
See application file for complete search history.

(56) References Cited

U.S. PATENT DOCUMENTS

| | | | |
|---|---|---|---|
| 6,834,386 B1* | 12/2004 | Douceur | G06F 9/4881 718/107 |
| 7,996,842 B2 | 8/2011 | Savit | |
| 8,706,798 B1* | 4/2014 | Suchter | G06F 9/5038 709/224 |
| 9,405,585 B2 | 8/2016 | Chess et al. | |
| 2008/0189708 A1* | 8/2008 | Cheng | G06F 9/542 718/102 |
| 2019/0220319 A1 | 7/2019 | Parees et al. | |
| 2020/0133724 A1* | 4/2020 | Chen | G06F 9/46 |
| 2020/0233774 A1* | 7/2020 | Toledano | G06F 16/288 |

\* cited by examiner

*Primary Examiner* — Wissam Rashid
(74) *Attorney, Agent, or Firm* — Norton Rose Fulbright US LLP (57) ABSTRACT

An information handling system may determine that a first process of a list of processes is a top-ranked process and may adjust one or more settings of the information handling system associated with the first process. The information handling system may monitor performance parameters of the information handling system following the adjustment of the settings. Based on monitoring the performance parameters, the information handling system may determine that a performance score of the information handling system is below a threshold performance score and may reduce a ranking of the first process based on the determination. The ranking of the first process may be reduced such that a second process becomes a new top-ranked process. The information handling system may then adjust one or more settings associated with the second process.

20 Claims, 5 Drawing Sheets

PROCESS PRIORITIZATION FOR INFORMATION HANDLING SYSTEMS

FIELD OF THE DISCLOSURE

The instant disclosure relates to performance enhancement of information handling systems. More specifically, portions of this disclosure relate to automated prioritization adjustment for information handling system processes.

BACKGROUND

As the value and use of information increase, individuals and businesses seek additional ways to process and store information. One option available for such a purpose is the information handling system. An information handling system generally processes, compiles, stores, and/or communicates information or data for business, personal, or other purposes thereby allowing users to take advantage of the value of the information. Because technology and information handling requirements vary between different users or applications, information handling systems may also vary regarding what information is handled, how the information is handled, how much information is processed, stored, or communicated, and how quickly and efficiently the information may be processed, stored, or communicated. Variations in information handling system build and capabilities allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may execute multiple system processes concurrently. For example, users may run multiple applications, such as gaming applications, productivity applications, system applications, video streaming applications, communications applications, and other applications, simultaneously, and each application may include multiple associated system processes. Different processes may require allocation of different amounts of resources. Allowing processes that are unimportant to a user to consume resources and/or starving processes that are important to a user of needed resources can negatively impact a user experience. For example, starving important processes of resources can cause decreases in frame rate, network lagging, application crashes, and other negative events.

In some cases, users may manually prioritize certain processes and/or applications, configuring an information handling system to prioritize allocating resources to specific applications or processes that a user deems important. However, manual prioritization can be time consuming and may require a level of technical knowledge that users may not possess. Furthermore, such prioritization may require a user to frequently interact with a prioritization user interface to adjust priorities as usage needs change. In other cases, processes and/or applications may be automatically prioritized based on resource consumption, such that processes that consume substantial system resources are prioritized over those that do not, or based on a designation of processes as foreground and background processes, such that foreground processes are prioritized over background processes. Such prioritization however, may negatively impact a user experience, as processes that require minimal system resources may be more important to a user than processes that require substantial system resources, and background processes may, in some cases, be more important to a user experience than foreground processes.

Shortcomings mentioned here are only representative and are included simply to highlight that a need exists for improved information handling systems. Embodiments described herein address certain shortcomings but not necessarily each and every one described here or known in the art. Furthermore, embodiments described herein may present other benefits than, and be used in other applications than, those of the shortcomings described above.

SUMMARY

An information handling system may initially prioritize processes based on resources consumed by the processes and/or whether the processes are foreground or background processes. The information handling system may determine which of the processes is a top-ranked process, which may be the process having the highest operating system priority, and may adjust system settings associated with that process to optimize execution of the process. For example, the information handling system may allocate additional system resources to the prioritized process. Performance of the information handling system may be monitored following the adjustment to determine if the adjustment enhanced operation of the information handling system, such as by improving responsiveness of the information handling system. In addition to monitoring hardware performance characteristics, user actions may also be monitored to determine if the adjustment enhanced operation of the information handling system according to the user's preferences.

Based on the monitoring, a performance score may be determined and compared with a threshold performance score. If the performance score is equal to or greater than the threshold performance score, the information handling system may maintain the current prioritization rankings and/or may record system parameters associated with the process for use in future operations. If the performance score is less than the threshold, the prioritization ranking of system processes may be adjusted such that a new process becomes the top-ranked process, and the information handling system may adjust system settings associated with the new top-ranked process. The information handling system may cycle through a prioritized list of processes until adjustments are made that cause the performance score to meet or exceed the performance threshold. Thus, the information handling system may automatically adjust system process prioritization based on system performance to enhance a user experience.

An information handling system may adjust prioritization of processes to bring a performance score for the information handling system to a desired level. A method for improving information handling system performance may begin with determining that a first process of a list of processes executed by the information handling system is a top-ranked process. The processes in the list of processes may be ranked by priority, which may be a priority automatically assigned by the operating system or a priority set by the user. The information handling system may then adjust one or more settings of the information handling system associated with the first process. For example, the information handling system may allocate additional system resources, in the form or processor time or available memory, to the first process.

After adjusting the settings associated with the first process, the information handling system may monitor one or more performance parameters of the information handling system. One example performance parameter is how the user responds after the adjustment. For example, the information handling system may monitor user actions taken following the adjustment of the one or more settings associated with the first process. User actions may indicate that an adjustment has negatively impacted performance such that the user experience is unpleasant. For example, if a user quits an application soon after the adjustment or opens a task manager window, the information handling system may infer that the adjustment had a negative impact on performance. Monitoring the one or more performance parameters may also include monitoring performance of an application executed by the information handling system. For example, a frame rate of a gaming application may be monitored by the information handling system.

Based on monitoring the one or more performance parameters, the information handling system may determine that a performance score of the information handling system is below a threshold performance score. For example, the information handling system may assign values to multiple measured statistics and/or detected user actions and may combine the values to determine a performance score of the information handling system. The performance score may be below a threshold performance score, such as zero, indicating that performance of the information handling system following the adjustment has not reached a desired level. The performance score may, for example, be reduced by user actions. For example, if the user exits an application associated with the first process soon after the adjustment of the system settings or opens a task manager window, the information handling system may reduce the performance score.

Based on the determination that the performance score is below the threshold performance score, the information handling system may reduce a ranking of the first process, such that a second process of the list of processes becomes a new top-ranked process. For example, the information handling system may remove the first process from the list of processes or may move the first process down the list of processes to a priority lower than the second process. The first process may, for example, be a foreground process, and the second process may, for example, be a background process, such that after the reduction in the ranking of the first process one or more background processes are given priority over a foreground process.

The information handling system may then adjust one or more settings of the information handling system associated with the second process and may monitor one or more performance parameters of the information handling system following the adjustment of the settings associated with the second process. The information handling system may determine that the performance score of the information handling system is greater than or equal to the threshold performance score following the adjustment of parameters related to the second process. In some embodiments, the determination may include determining that the performance score has been greater than or equal to the threshold performance score for at least a threshold period of time.

Based on the determination that the performance score is greater than or equal to the threshold, the information handling system may log one or more system statistics associated with the second process. For example, the information handling system may record the system process, the adjustments made to the one or more system settings associated with the second process, and the performance score. The information handling system may also record system parameters such as resource allocation and a list of system processes and/or applications executed by the information handling system.

An information handling system may include a memory and a processor for performing the steps described herein. Instructions for performing the steps described herein may be stored on a non-transitory computer readable medium.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, a two-in-one laptop/tablet computer, mobile device (e.g., personal digital assistant (PDA), smart phone, tablet computer, or smart watch), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more virtual or physical buses operable to transmit communications between the various hardware and/or software components.

Figure 1:
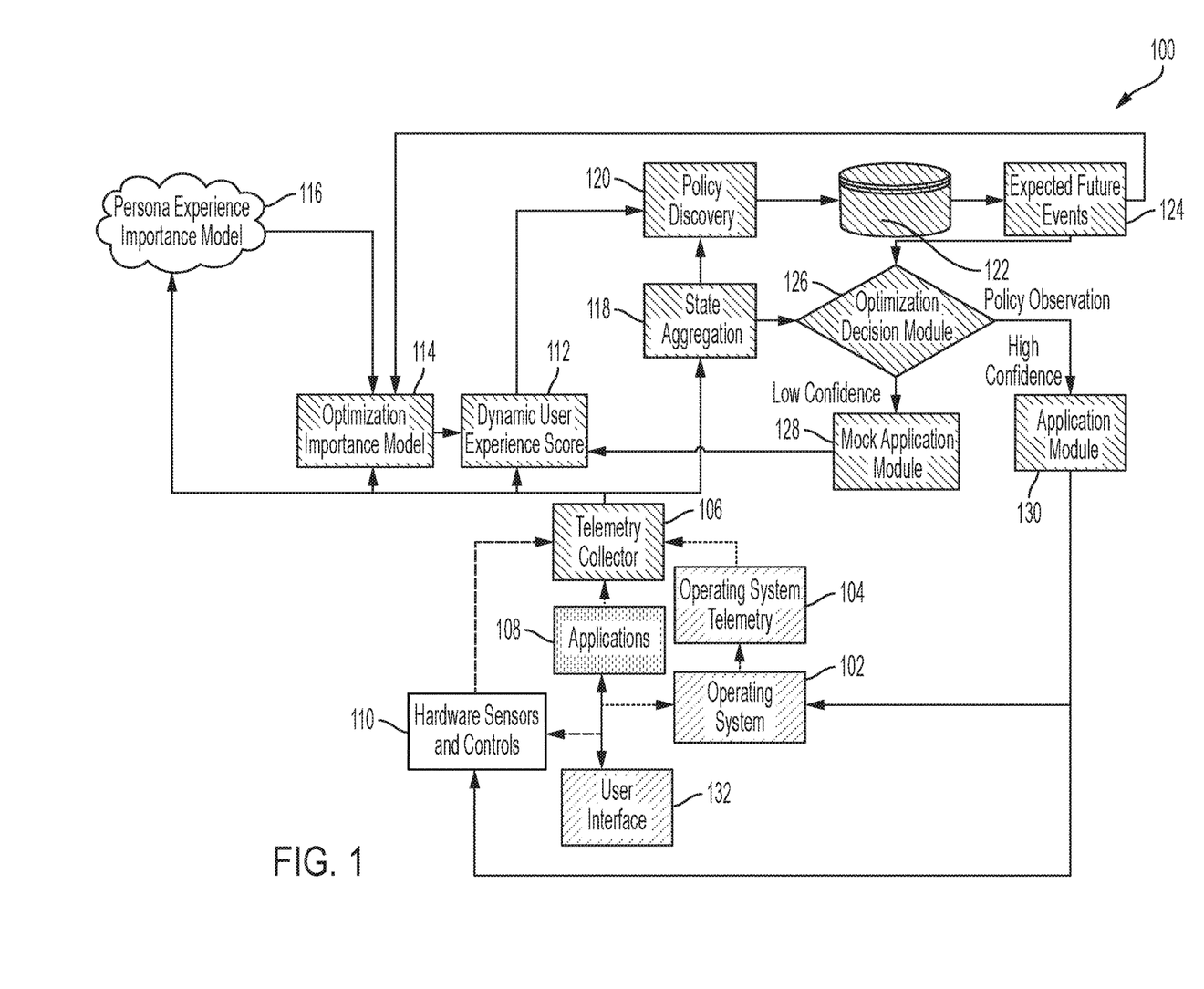
FIG. 1 is a diagram of an example information handling system with automated process prioritization, according to some embodiments of the disclosure.

An information handling system may adjust prioritization of process execution in order to enhance a user experience. For example, certain processes that are more important to a user and/or have more impact on a user experience may be prioritized over processes that are less important to the user or have less of an impact on the user experience. For example, the information handling system may devote more resources (such as processor time and/or memory space) to certain processes while devoting fewer resources to other processes. An example information handling system 100 may execute an operating system 102. The information handling system 100 may also execute one or more applications 108. The operating system 102 and the applications 108 may each execute one or more system processes. A user may interact with the applications 108 and/or the operating system 102 via a user interface 132. Hardware sensors and controls 110 of the information handling system 100 may monitor and control hardware operation of the information handling system 100. An operating system telemetry module 104 may collect telemetry data from the operating system 102. A telemetry collector 106 may collect telemetry data from the operating system telemetry module 104, the one or more applications 108, and the hardware sensors 110. The telemetry data collected by the telemetry collector 106 may be provided to a dynamic user experience score module 112 to determine a dynamic user experience score. The dynamic user experience score may provide a rating of the information handling system based on a user experience. A higher dynamic user experience score may indicate a better user experience. Telemetry data from the telemetry collector 106 may also be provided to a persona experience importance model 116 and used in determining a persona for the user of the information handling system and how different performance characteristics of the information handling system may affect users with different personas. For example, different personas may be assigned to different users based on behavior observed in the telemetry data, such as frequent gaming, offline-to-online or online-to-offline status changes, frequent use of video editing applications, and other user behaviors. The persona experience importance model 116 may rank processes executed by the information handling system, such as processes of the applications 108 and operating system 102 based on importance of the processes to a user experience of users with similar behavior patterns. The persona experience importance model 116 may be located on the information handling system 100, located in an external cloud-based system, or a combination of local and remote systems.

An optimization importance model 114 may receive persona experience importance information from the persona experience importance model 116 and telemetry data from the telemetry collector 106. The optimization importance model 114 may also receive expected future events data from an expected future events module 124. The optimization importance model 114 may determine an importance of optimization of one or more processes of the information handling system 100 and may pass the importance data to the dynamic user experience score module 112. The dynamic user experience score module 112 may pass a dynamic user experience score to a policy discovery module 120. The telemetry collector 106 may also feed telemetry data to a state aggregation module 118 which may aggregate state information for the information handling system 100. The state aggregation module 118 may feed state information to the policy discovery module 120. Based on the state information and the dynamic user experience score, the policy discovery module 120 may determine policy information and may feed the policy information to a policy observations database 122. The policy observations database 122 may feed the policy information to the expected future events module 124 which may determine one or more expected future events of the information handling system 100 based on the policy information.

State aggregation information from the state aggregation module 118 and expected future events information from the expected future events module 124 may be fed to a decision module 126. The decision module 126 may determine one or more adjustments to be performed based on the state aggregation information and the expected future events. For example, the decision module 126 may determine one or more adjustments to be performed based on a process that is determined to be a highest ranking process by the importance model 114. The decision module 126 may make decisions with low confidence or high confidence. If an adjustment decision is made with low confidence, the decision module 126 may feed instructions to a mock application module 128. The mock application module 128 may perform a simulation of the adjustments determined by the optimization decision module 126 and feed the results of the simulation to the dynamic user experience score module 112. The dynamic user experience score module 112 may then determine if the simulation indicates that the optimization would increase or decrease the dynamic user experience score. That information may then be fed to the policy discovery module 120 and may eventually be used by the decision module 126 to determine one or more adjustments that should be made. For example, a positive result from the mock application module 128 may increase the confidence of the decision module 126 decision. If the decision module 126 makes a decision with high confidence, the decision module may feed the adjustment to an application module 130. The application module 130 may instruct the operating system 102 and/or hardware sensors and controls 110 to make one or more adjustments based on the decision. The adjustments may include, for example, allocating additional system resources to a system process with high priority. The results of the adjustments may then be reflected in collected telemetry data and an updated dynamic user experience score. The optimization importance model 114, persona experience importance model 116, dynamic user experience score module 112, telemetry collector 106, state aggregation module 118, policy discovery module 120, policy observations database 122, expected future events module 124, decision module 126, mock application module 128, and application module 130 may all be components of a reinforcement learning system of the information handling system for improving information handling system performance in an automated manner using intelligence from previous decisions. Thus, an information handling system may dynamically adjust optimization of system processes, and the system overall, based on a dynamic user experience score, to enhance a user experience.

Figure 2:
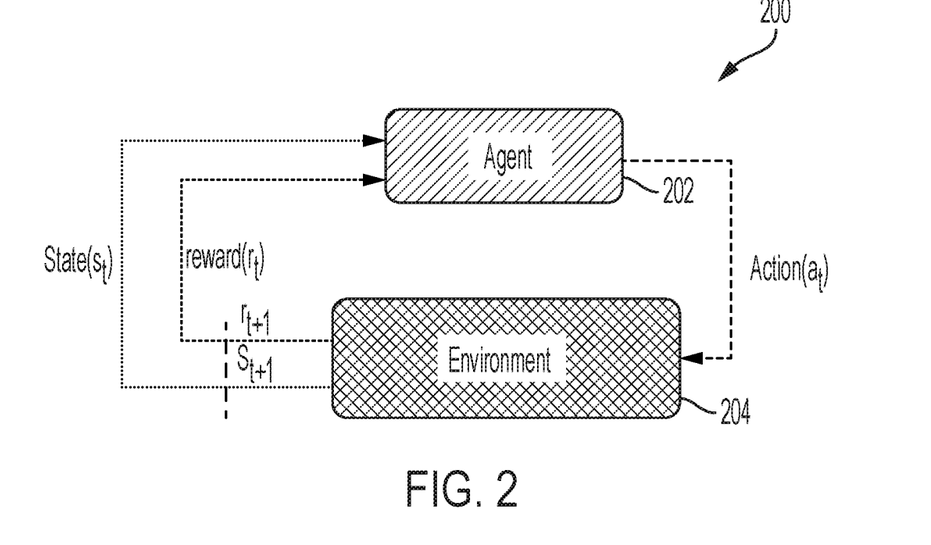
FIG. 2 is a flow diagram of an example reinforcement learning loop, according to some embodiments of the disclosure.

An information handling system may implement a reinforced learning algorithm to determine whether adjustments performed on an information handling system enhance a user experience. An example reinforcement learning loop 200 is shown in FIG. 2. The reinforcement learning loop 200 may include an environment 204 and an agent 202. The agent 202 may, for example, include one or more applications configured to monitor, configure, and communicate with applications, an operating system, firmware, and hardware of an information handling system. The environment 204 may, for example, be an operating environment of the agent 202, such as a software stack of the information handling system, which may include an embedded controller, a basic input/output system (BIOS), an operating system (OS), and applications executed by the information handling system. In some embodiments, the environment 204 may be restricted to only an OS, applications, or user-created data.

The agent 202 may monitor the environment 204 and may adjust the environment based on the monitoring to enhance performance. The agent may monitor state information, such as system power state information, such as sleep, standby, and off, performance state information, such as power profiles, overclocking data, hyper-threading data, Vsync data, caching performance data, and system settings, and repair state information of the information handling system, such as system backup information, recovery information, diagnostic test information, and SOS mode information. The agent 202 may also perform state changes, such as disabling a fast charging capability of the information handling system or reducing a top charge voltage. For example, the agent 202 may monitor a state $s_t$ at time t. The agent 202 may monitor performance parameters of the information handling system. Based on monitored state information and performance information, the agent 202 may select one or more policies to govern adjustments of the information handling system. Policies may be used to determine actions to be performed based on a current state of the information handling system to cause decisions to maximize a particular reward. Policies may, for example, include a policy for extending battery runtime, an interactive fault tolerance policy, a battery service life policy to extend a battery service lifetime, an interactive fan adjustment policy, and other policies.

The agent 202 may take one or more actions ($a_t$) that impact the environment at time t. For example, the agent 202 may adjust one or more settings of the information handling system to adjust operation of the information handling system. For example, the agent 202 may take a series of actions based on a performance improvement policy to remove applications and/or processes operating in the background of an information handling system. The agent 202 may turn off non-essential hardware components based on a battery maximization policy. Agents may also be configured to record backup data and accept or reject driver updates. Actions may include adjustments to system hardware settings such as fan speed, screen brightness, speaker volume, and Bluetooth settings, adjustment to application settings, such as removing an application from automatic execution at startup and enabling or disabling notifications, and OS settings, such as adjustments to sizes and locations of page files and application or rejection of updates to the OS.

After adjusting settings, the agent 202 may monitor the environment 204 to determine if the adjustments improved performance (e.g., responsiveness, frame rate, lower processor utilization, more processor time available for a top-ranked process, lower processor temperature, longer battery life, etc.) of the information handling system. If the adjustments did improve performance, the agent 202 may calculate a reward, increasing prioritization of such adjustments in the future. If the adjustments reduced performance, the agent 202 may calculate a negative reward, deprioritizing such adjustments in the future. The reward may be a metric used to determine the success or failure of the agent's action. As one example, if the agent 202 reduces screen brightness to improve battery life and a user overrides the change to increase brightness, a calculated reward may be negative. For example, the reward $r_{t+1}$ may be calculated at time t+1 when a state $s_{t+1}$ is observed in the environment 204. Various factors can be considered in determining whether the adjustments enhanced performance of the information handling system, such as a user experience, performance statistics of the information handling system, security of the information handling system, and management of a health of the information handling system. The reinforcement learning algorithm may learn from user interactions with the information handling system and performance of the information handling system and may adapt continuously to a changing environment. Such operation may provide advantages over a supervised labelled data environment, such as reduced expense, applicability to specific problem areas, and enhanced responsiveness to user feedback. A reinforcement learning algorithm may be applied to an information handling system to determine processes that should be prioritized and settings adjustments that should be made based on the process prioritization.

Figure 3:
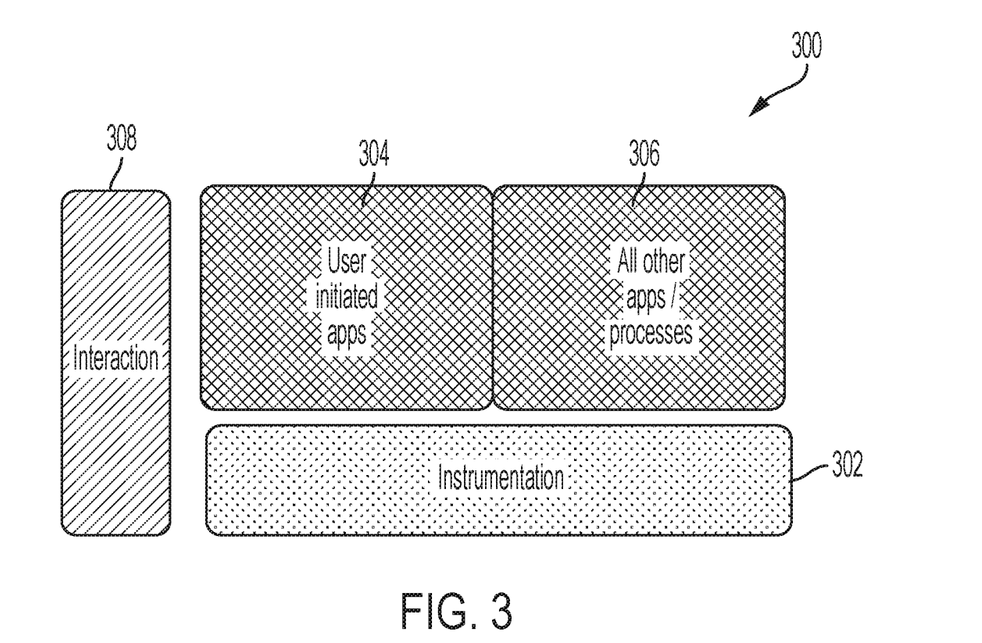
FIG. 3 is a diagram of an example user environment of an information handling system, according to some embodiments of the disclosure.

An information handling system user environment 300, shown in FIG. 3, may include multiple components. For example, the user environment 300 may include user-initiated applications 304, which may each include multiple processes. The information handling system may, by default, prioritized user-initiated applications 304 and associated processes. The user environment 300 may also include other applications and processes 306 that were not user initiated. The user environment 300 may also include instrumentation 302 for measuring one or more parameters, such as internal performance statistics, associated with the information handling system and for monitoring user interaction 308 with the user environment 300.

Figure 4:
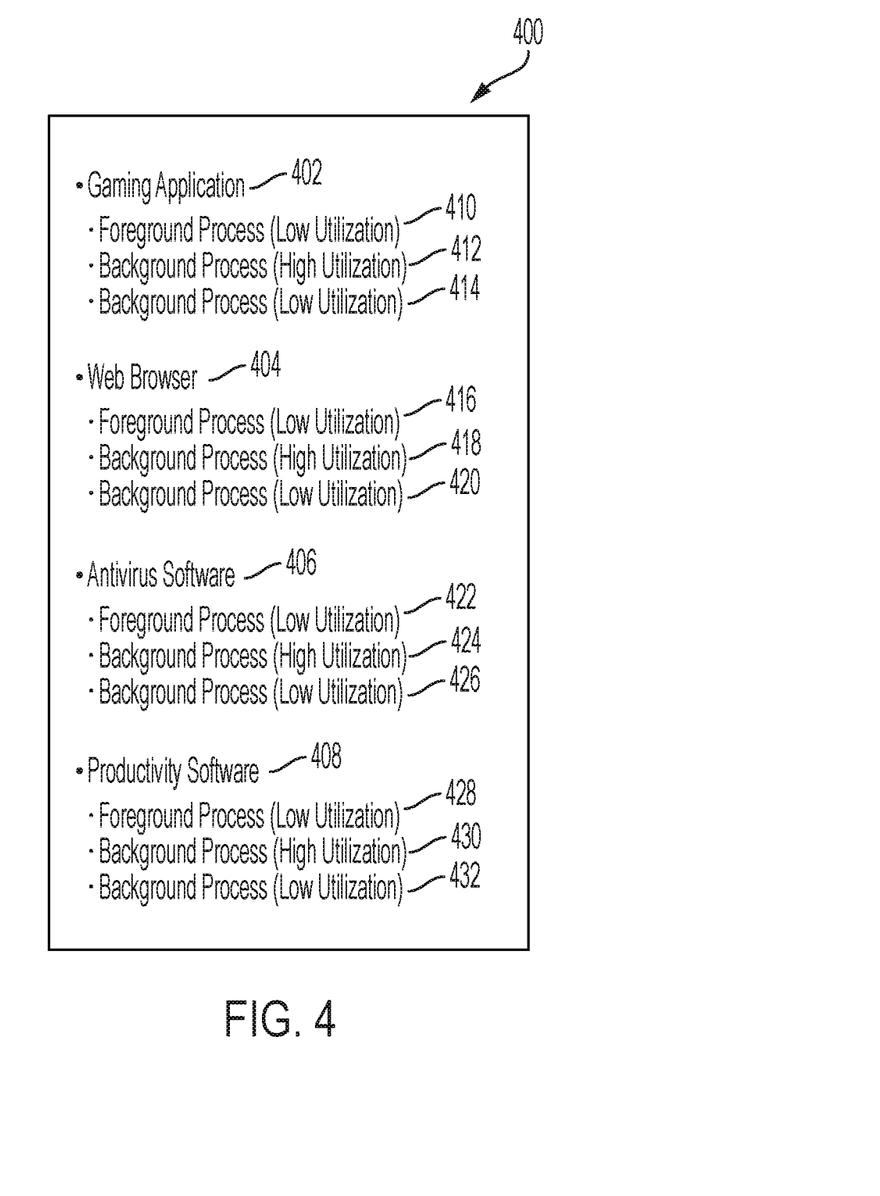
FIG. 4 is an example ranked list of processes executed by an information handling system, according to some embodiments of the disclosure.

An information handling system may prioritize one or more processes being executed by the information handling system and may adjust one or more settings of the information handling system associated with the processes to optimize operation of the information handling system. An example list of processes 400 is shown in FIG. 4. For example, an information handling system may organize multiple processes being executed concurrently by the information handling system in a list 400 ranked by priority in descending order. The processes may be associated with multiple applications. In some embodiments, processes that are resource intensive, or are associated with applications that are resource intensive, may, by default, be given priority over processes that are not resource intensive. Processes in the list 400 may be organized according to a greedy default organization scheme where processes are prioritized according to resource requirements. Processes may be foreground processes and background processes, and foreground processes may, by default, be given priority over background processes. In some embodiments, the processes may be initially organized based on testing performed in a lab environment to determine which processes should be prioritized in order to enhance a user experience. For example, a policy for initial process organization may be determined based on simulated testing and may be used to create an initial ranked list of processes concurrently executed by the information handling system. The information handling system may rank processes associated with a gaming application 402 as having a top priority over processes associated with a web browser 404, processes associated with antivirus software 406, and processes associated with productivity software 408. For example, a foreground process 410 with low system resource utilization and associated with the gaming application 402 may be top-ranked, followed by a background process with high utilization 412 and a background process with low utilization 414 associated with the gaming application 402. Following the processes associated with the gaming application 402, a foreground process 416 with low utilization and associated with the web browser 404 may be followed by a background process with high utilization 418 and a background process with low utilization 420 associated with the web browser 404. Following the processes associated with the web browser 404, a foreground process 422 with low utilization and associated with the antivirus software 406 may be followed by a background process with high utilization 424 and a background process with low utilization 426 associated with the antivirus software 406. Following the processes associated with the antivirus software 406 a foreground process 428 with low utilization and associated with the productivity software 408 may be followed by a background process with high utilization 430 and a background process with low utilization 432 associated with the productivity software 408. Other processes may also be included in the list 404, such as processes associated with an operating system, processes associated with video streaming applications, processes associated with video editing applications, processes associated with voice or text chat applications, processes associated with game streaming applications, processes associated with music playing applications, game update processes, and other kinds of processes.

Figure 5:
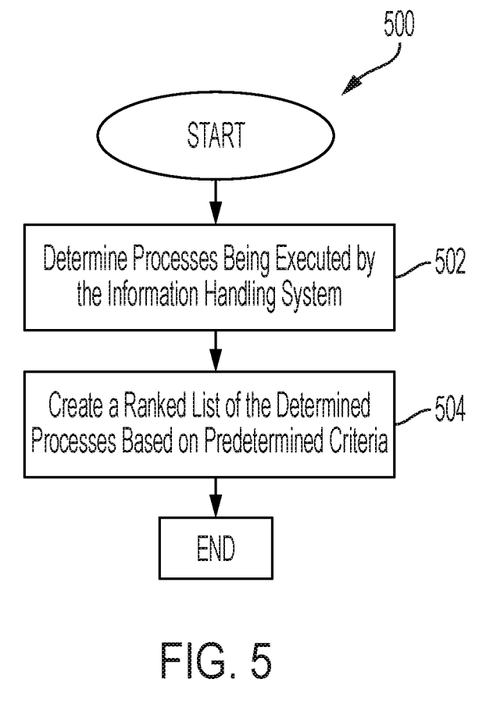
FIG. 5 is a flow chart of an example method for ranking processes being executed by an information handling system, according to some embodiments of the disclosure.

Processes may be ranked in a list, such as list 400, as shown in the example method 500 of FIG. 5. The method 500 may begin, at step 502, with determining processes being executed by an information handling system. For example, an information handling system may determine processes associated with applications, an operating system, and other processes that are being executed concurrently by the information handling system. At step 504, the information handling system may create a ranked list of the determined processes based on predetermined criteria. For example, the information handling system may, by default, rank processes that consume substantial resources over processes that consume few system resources and may rank foreground processes over background processes. In some embodiments, the information handling system may first rank applications being executed by the information handling system and may then rank processes associated with the applications based on the application rankings. Processes in the list may be organized according to a greedy default organization scheme where processes are prioritized according to resource requirements. In some embodiments, the processes may be organized based on testing performed in a simulated environment to determine which processes should be prioritized in order to enhance a user experience. For example, a policy for initial process organization may be determined based on lab testing and may be used to create an initial ranked list of processes concurrently executed by the information handling system. In some embodiments, processes initiated by a user, such as processes associated with user-initiated applications, may be given priority over processes initiated automatically by an information handling system, such as OS and/or management processes. For example, an agent operating on the information handling system may record whether policies were initiated automatically or by a user and may rank policies that are initiated by a user higher than policies that are initiated automatically.

Figure 6:
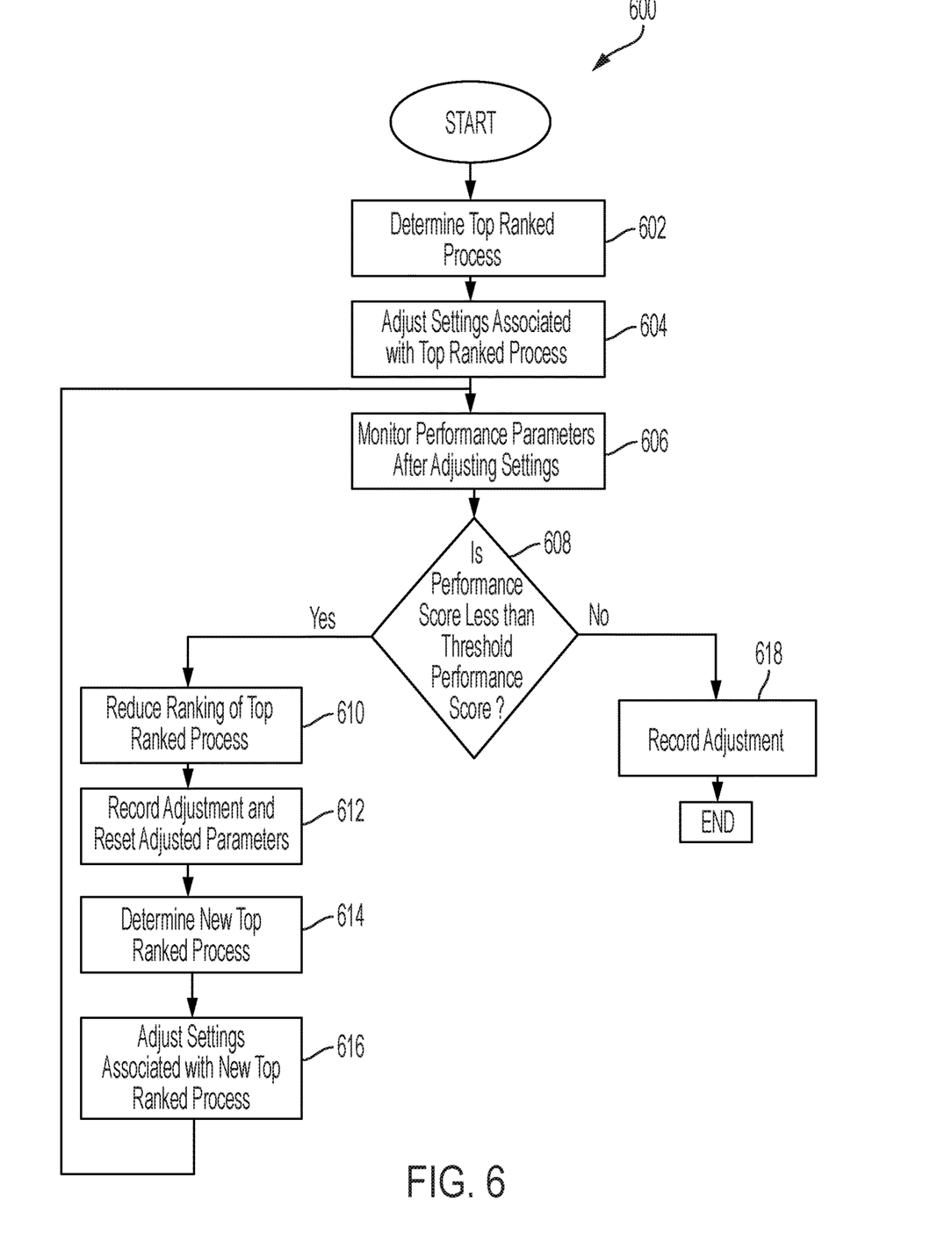
FIG. 6 is a flow chart of an example method for automated process prioritization on an information handling system according to some embodiments of the disclosure.

Settings of an information handling system may be adjusted based on a ranking of system processes in order to enhance performance of the information handling system. The information handling system may determine if the adjustments to the settings enhanced operation of the information handling system, and may adjust a ranking of processes based on whether or not the adjustments enhanced operation. For example, a reinforcement learning agent may be executed by the information handling system to manage prioritization of processes executed by the information handling system. The agent may, for example, include one or more applications able to connect with, configure, and monitor software, hardware, firmware, and an operating system of the information handling system. An example method 600 for optimizing performance of an information handling system is shown in FIG. 6. The method 600 may begin, at step 602, with determining a top-ranked process. For example, an information handling system may determine a top-ranked process using a ranked list of processes as discussed with respect to FIGS. 4 and 5. The top-ranked process may, for example, be a foreground process that consumes substantial resources, such as a foreground gaming process. In some embodiments, the system may determine a top-ranked process and begin method 600 when the system encounters a system level resource bottleneck, in which the system does not have sufficient system resources to fully satisfy the demands of all system processes being executed. In some embodiments, block 602 may include an arbitrary selection of a process for which to improve performance of using the feedback system described herein.

At step 604, the information handling system may adjust one or more settings associated with the top-ranked process. For example the information handling system may apply a performance boost to the process. In some embodiments, the information handling system may apply a performance boost to multiple processes associated with a single application, when that application is a top-ranked application. Examples of settings adjustments include adjusting process settings within an application, adjusting hyper-threading settings, adjusting power management settings, adjusting a clock frequency of one or more processors of the information handling system, adjusting super fetch settings, and/or adjusting cache settings associated with the process.

After the settings are adjusted, the information handling system may, at step 606, monitor performance parameters of the information handling system. Monitoring performance parameters may include both monitoring internal performance statistics, such as resource and input/output utilization by the top-ranked process, overall system utilization, and system events, and monitoring user actions taken after the adjustments are made. For example, the information handling system may monitor acts taken by a user after the settings are adjusted, such as opening of a task manager, closing or pausing of background applications, processes, or services such as updates and/or virus scans to make more resources available, restarting the information handling system, closing an application, restarting an application, uninstalling and/or reinstalling an application, performing system maintenance, such as cleanup of a temporary directory, and other user actions. Such actions may provide implicit user feedback on adjustments and may indicate that the adjustments had a negative impact on system performance and, by extension, a user experience. Monitoring internal performance statistics may include monitoring frames per second (FPS) of an application, detecting bottlenecks, monitoring gaming statistics, such as actions per minute, monitoring bottlenecks, monitoring latency, and other internal performance statistics. For example, increased FPS or actions per minute may indicate enhanced performance, while increased latency or decreased FPS may indicate that the adjustments were detrimental to performance.

At step 608, the information handling system may determine whether a performance score is less than a threshold performance score. For example, a performance score may be determined based on the performance parameters, where a higher performance score indicates better performance. For example, acts taken by a user or internal performance statistics that indicate that the adjustments had a negative impact on system performance may decrease the performance score, while acts taken by the user or internal performance statistics that indicate that the adjustments had a positive impact on system performance may increase the performance score. An increase in frame rate of a gaming application may increase the performance score, while opening of a task manager by a user and terminating of one or more processes via the task manager may decrease the performance score. A baseline performance score may be set at zero. If the performance score is greater than zero, the information handling system may determine that the adjustments at step 604 improved performance of the information handling system, while if the performance score is less than zero the information handling system may determine that the adjustments at step 604 had a negative impact on information handling system performance. In some embodiments, the threshold performance score may be set at a level above zero, such that a certain level of performance improvement above the baseline is required to exceed the threshold performance score. In some embodiments, the system may require that a performance score equal or exceed a threshold performance score for at least a predetermined period of time, indicating a steady long-term positive performance score.

If the performance score is determined, at step 608, to be greater than or equal to the threshold performance score, the information handling system may record information related to the process that had the highest priority and the adjustment that was made. For example, information recorded by the information handling system may include the application with which the process is associated, the date and time at which the adjustments were made, a name of a network to which the information handling system was connected, a location of the information handling system, an operation mode of the information handling system, such as a tablet mode or a laptop mode, a power state of the information handling system, such as operating from an external AC power source or an internal battery, the process that was top-ranked when the adjustment was made, the specific adjustments to settings that were made, other applications and processes that the information handling system was executing concurrently, and other information. The information handling system may use this information to make adjustments to system settings in the future, when the system is running the same process under similar operating conditions. For example, the next time the information handling system encounters a resource bottleneck, while executing the process, the information handling system may automatically prioritize the process and adjust system settings based on the process.

If the performance score is determined, at step 608, to be less than the threshold performance score, the information handling system may, at step 610, reduce the ranking of the top-ranked process. In some embodiments the ranking of the process may be reduced such that it is moved to the bottom of the list. In other embodiments, the ranking of the process might be adjusted such that the process is moved down the list, but not to the bottom of the list. For example, if the foreground process 410 of FIG. 4 was the top-ranked process, and adjustment of system settings associated with process 410 did not result in a sufficient performance score, the information handling system might move foreground process 410 to the bottom of list 400. Thus, background process 412 would become the new top-ranked process. In some embodiments, all processes associated with an application with which the top-ranked process was associated might be moved to the bottom of the list. Thus, foreground process 416 could become the new top-ranked process.

At step 612, the information handling system may record the adjustment of settings made at step 604 and may reset the adjusted parameters. For example, information recorded by the information handling system may include the application with which the process is associated, the date and time at which the adjustments were made, a name of a network to which the information handling system was connected, a location of the information handling system, an operation mode of the information handling system, such as a tablet mode or a laptop mode, a power state of the information handling system, such as operating from an external AC power source or an internal battery, the process that was top-ranked when the adjustment was made, the specific adjustments to settings that were made, other applications and processes that the information handling system was executing concurrently, and other information. The information may be recorded along with an identifier that indicates that the adjustments did not cause the performance score to exceed the threshold performance score. The information handling system may use this information to adjust system settings in the future, when the system is running the same process under similar operating conditions. In some embodiments, the information handling system may not reset the adjusted parameters, and may adjust the parameters at a later time, such as when a new top-ranked process is determined and adjustments to system settings are made based on the new top-ranked process.

At step 614, a new top-ranked process may be determined. For example, the process that was ranked immediately below the top-ranked process at step 602 may become the new top-ranked process when the ranking of the former top-ranked process is reduced. In some case, a background process, or a process that consumes fewer system resource, may be ranked above a foreground process, or a process that consumes more system resources. At step 616, the information handling system may adjust settings associated with the new top-ranked process. The adjustments may include adjustments similar to those described with respect to 604, but the settings may be adjusted based on the new top-ranked process rather than the old top-ranked process. The method may then proceed to step 606 to monitor performance parameters after one or more system settings associated with the new top-ranked process are adjusted. Thus, the information handling system may continue to revise a ranked list of processes and adjust parameters based on different top-ranked processes until an adjustment causes the performance score to meet or exceed the threshold performance score.

The flow chart diagrams of FIGS. 5-6 are generally set forth as logical flow chart diagrams. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

The invention claimed is:

1. A method, comprising:
   determining that a first process of a list of processes executed by an information handling system, ranked by priority, is a top-ranked process;
   adjusting one or more settings of the information handling system associated with the first process;
   monitoring one or more performance parameters of the information handling system following the adjustment of the one or more settings of the information handling system associated with the first process;
   determining, based on the monitoring, that a performance score of the information handling system is below a threshold performance score;
   reducing a ranking of the first process, based on the determination that the performance score of the information handling system is below the threshold performance score, such that a second process becomes a new top-ranked process; and
   adjusting one or more settings of the information handling system associated with the second process.

2. The method of claim 1, wherein the first process is a foreground process, and wherein the second process is a background process.

3. The method of claim 1, wherein monitoring one or more performance parameters comprises monitoring user actions taken following the adjustment of the one or more settings of the information handling system associated with the first process.

4. The method of claim 3, wherein determining, based on the monitoring, that a performance score of the information handling system is below a threshold performance score comprises reducing the performance score based on the one or more user actions.

5. The method of claim 1, wherein monitoring one or more performance parameters comprises monitoring performance of an application executed by the information handling system.

6. The method of claim 1, further comprising:
   monitoring one or more performance parameters of the information handling system following the adjustment of the one or more settings of the information handling system associated with the second process;
   determining, based on monitoring the one or more performance parameters of the information handling system following the adjustment of the one or more settings of the information handling system associated with the second process, that the performance score of the information handling system is greater than or equal to the threshold performance score; and
   logging one or more system statistics associated with the second process based on the determination that the performance score is greater than or equal to the threshold performance score.

7. The method of claim 6, wherein determining that the performance score of the information handling system is greater than or equal to the threshold performance score comprises determining that the performance score remains greater than or equal to the threshold performance score for at least a threshold time period following the adjustment of the one or more settings of the information handling system associated with the second process.

8. An information handling system comprising:
   a processor; and
   a memory;
   wherein the processor is configured to perform steps comprising:

determining that a first process of a list of processes executed by the information handling system, ranked by priority, is a top-ranked process;

adjusting one or more settings of the information handling system associated with the first process;

monitoring one or more performance parameters of the information handling system following the adjustment of the one or more settings of the information handling system associated with the first process;

determining, based on the monitoring, that a performance score of the information handling system is below a threshold performance score;

reducing a ranking of the first process, based on the determination that the performance score of the information handling system is below the threshold performance score, such that a second process becomes a new top-ranked process; and adjusting one or more settings of the information handling system associated with the second process.

9. The information handling system of claim 8, wherein the first process is a foreground process, and wherein the second process is a background process.

10. The information handling system of claim 8, wherein monitoring one or more performance parameters comprises monitoring user actions taken following the adjustment of the one or more settings of the information handling system associated with the first process.

11. The information handling system of claim 10, wherein determining, based on the monitoring, that a performance score of the information handling system is below a threshold performance score comprises reducing the performance score based on the one or more user actions.

12. The information handling system of claim 8, wherein monitoring one or more performance parameters comprises monitoring performance of an application executed by the information handling system.

13. The information handling system of claim 8, wherein the processor is further configured to perform steps comprising:

monitoring one or more performance parameters of the information handling system following the adjustment of the one or more settings of the information handling system associated with the second process;

determining, based on monitoring the one or more performance parameters of the information handling system following the adjustment of the one or more settings of the information handling system associated with the second process, that the performance score of the information handling system is greater than or equal to the threshold performance score; and logging one or more system statistics associated with the second process based on the determination that the performance score is greater than or equal to the threshold performance score.

14. The information handling system of claim 13, wherein determining that the performance score of the information handling system is greater than or equal to the threshold performance score comprises determining that the performance score remains greater than or equal to the threshold performance score for at least a threshold time period following the adjustment of the one or more settings of the information handling system associated with the second process.

15. A computer program product, comprising:
a non-transitory computer readable medium comprising instructions for causing an information handling system to perform steps comprising:

determining that a first process of a list of processes executed by the information handling system, ranked by priority, is a top-ranked process;

adjusting one or more settings of the information handling system associated with the first process;

monitoring one or more performance parameters of the information handling system following the adjustment of the one or more settings of the information handling system associated with the first process;

determining, based on the monitoring, that a performance score of the information handling system is below a threshold performance score;

reducing a ranking of the first process, based on the determination that the performance score of the information handling system is below the threshold performance score, such that a second process becomes a new top-ranked process; and adjusting one or more settings of the information handling system associated with the second process.

16. The computer program product of claim 15, wherein the first process is a foreground process, and wherein the second process is a background process.

17. The computer program product of claim 15, wherein monitoring one or more performance parameters comprises monitoring user actions taken following the adjustment of the one or more settings of the information handling system associated with the first process.

18. The computer program product of claim 17, wherein determining, based on the monitoring, that a performance score of the information handling system is below a threshold performance score comprises reducing the performance score based on the one or more user actions.

19. The computer program product of claim 15, wherein monitoring one or more performance parameters comprises monitoring performance of an application executed by the information handling system.

20. The computer program product of claim 15, wherein the non-transitory computer readable medium further comprises instructions for causing an information handling system to perform steps comprising:

monitoring one or more performance parameters of the information handling system following the adjustment of the one or more settings of the information handling system associated with the second process;

determining, based on monitoring the one or more performance parameters of the information handling system following the adjustment of the one or more settings of the information handling system associated with the second process, that the performance score of the information handling system is greater than or equal to the threshold performance score; and logging one or more system statistics associated with the second process based on the determination that the performance score is greater than or equal to the threshold performance score.

* * * * *